US012705933B2

(12) United States Patent
Lee et al.

(10) Patent No.: US 12,705,933 B2
(45) Date of Patent: Aug. 11, 2026

(54) SYSTEM FOR MANAGING ELECTRONIC CARD OF VEHICLE, APPARATUS THEREFOR, AND METHOD THEREFOR

(71) Applicants: Hyundai Motor Company, Seoul (KR); Kia Corporation, Seoul (KR)

(72) Inventors: Seung Jae Lee, Gwangmyeong-si (KR); Dong Chan Shin, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 50 days.

(21) Appl. No.: 18/598,919

(22) Filed: Mar. 7, 2024

(65) Prior Publication Data

US 2025/0148833 A1 May 8, 2025

(30) Foreign Application Priority Data

Nov. 7, 2023 (KR) ........................ 10-2023-0152886

(51) Int. Cl.

| | |
|---|---|
| ***G07B 15/06*** | (2011.01) |
| ***G06F 16/23*** | (2019.01) |
| ***G06Q 20/34*** | (2012.01) |
| ***H04W 4/40*** | (2018.01) |

(52) U.S. Cl.

CPC ........... *G07B 15/063* (2013.01); *G06F 16/23* (2019.01); *G06Q 20/351* (2013.01); *H04W 4/40* (2018.02)

(58) Field of Classification Search

CPC ........ G07B 15/063; H04W 4/40; G06F 16/23; G06Q 20/351

USPC ........................................................... 705/13

See application file for complete search history.

(56) References Cited

U.S. PATENT DOCUMENTS 11,495,060 B1 * 11/2022 Kelley ............... G06Q 20/4014

OTHER PUBLICATIONS

"A Unique Identity based Automated Toll Collection System using RFID and Image Processing" Published by IEEE (Year: 2018).*

* cited by examiner

*Primary Examiner* — Zeina Elchanti

(74) *Attorney, Agent, or Firm* — Slater Matsil, LLP

(57) ABSTRACT

In an embodiment, a system for managing an electronic card of a vehicle, an apparatus therefor, and a method therefor can include a processor configured to recognize a unique identification of a terminal loaded in the vehicle, compare the unique identification of the terminal loaded in the vehicle with a first unique identification stored in a memory to determine whether the terminal loaded in the vehicle is replaced, and if it is determined that the terminal loaded in the vehicle is replaced with a second terminal different from the first terminal, transmit a second unique identification of the second terminal to a server. The server may update the first unique identification to the second unique identification transmitted from the processor and delete a second electronic card previously issued to the second terminal.

20 Claims, 5 Drawing Sheets

SYSTEM FOR MANAGING ELECTRONIC CARD OF VEHICLE, APPARATUS THEREFOR, AND METHOD THEREFOR

CROSS-REFERENCE TO RELATED APPLICATIONS

This application claims the benefit of Korean Patent Application No. 10-2023-0152886, filed on Nov. 7, 2023, which application is hereby incorporated herein by reference.

TECHNICAL FIELD

The present disclosure relates to a system for managing an electronic card of a vehicle, an apparatus therefor, and a method therefor.

BACKGROUND

Recently, an electronic card capable of paying a toll on a toll road without a physical card has been introduced. The electronic card may be a payment modality of a car-pay service that is one of in-car-payment services and may remove the inconvenience of issuing an existing plastic card, delivering the existing plastic card, and checking usage details of the existing plastic card.

Thus, to use the electronic card, rather than a terminal capable of mounting an existing plastic card, a terminal for electronic card capable of embedding the electronic card should be loaded into a vehicle. The terminal for electronic card may include an embedded electronic card terminal.

When the electronic card is used by use of the electronic card terminal, as the payment of the electronic card is not correctly performed, there may be a need to repair the electronic card terminal. In this case, the electronic card terminal may be replaced to test the electronic card terminal.

When there is an electronic card previously issued to a terminal replaced to be tested, the electronic card in another person's name may be randomly used. Thus, when the terminal is replaced, there is a need to delete an electronic card issued to the replaced terminal.

Furthermore, after the repair of the existing electronic card terminal is completed, the existing electronic card terminal may be replaced again in an original vehicle. In this case, although an electronic card is issued in the existing electronic card terminal replaced again, as the electronic card is one's own electronic card, it should not be deleted.

Thus, when the electronic card terminal is replaced, to prevent an electronic card in another person's name from being used, there is a need for a technology for deleting the electronic card issued to the replaced electronic card terminal and a technology for failing to delete an electronic card issued to the existing electronic card terminal when the replaced terminal is replaced with the existing electronic card terminal again.

SUMMARY

The present disclosure relates to a system for managing an electronic card of a vehicle, an apparatus therefor, and a method therefor and, in particular embodiments, relates to an electronic card terminal for wirelessly paying a toll in a vehicle.

Some embodiments of the present disclosure can solve the above-mentioned problems occurring in the prior art while advantages achieved by the prior art can be maintained intact.

An embodiment of the present disclosure provides a system for managing an electronic card of a vehicle to delete an electronic card of a replaced terminal, which is previously issued in response to the replaced terminal, when it is determined that a terminal loaded into a vehicle is replaced, to prevent the electronic card in another person's name from being randomly used, an apparatus therefor, and a method therefor.

An embodiment of the present disclosure provides a system for managing an electronic card of a vehicle to back up data associated with an electronic card of an existing terminal, when a terminal loaded into the vehicle is replaced, to activate the electronic card of the existing terminal and an electronic card of a server, using the backed-up data, when the replaced terminal is replaced with the existing terminal again, an apparatus therefor, and a method therefor.

An embodiment of the present disclosure provides a system for managing an electronic card of a vehicle to delete backed-up data of an existing terminal, when a new electronic card is issued to the replaced terminal or the existing terminal, to prevent the backed-up data of the existing terminal from being leaked, an apparatus therefor, and a method therefor.

An embodiment of the present disclosure provides a system for managing an electronic card of a vehicle to fail to delete an electronic card issued to an existing terminal, when it is replaced with the existing terminal, to have the convenience of not having to newly generate an electronic card in the existing terminal, an apparatus therefor, and a method therefor.

Technical problems to be solved by the present disclosure are not necessarily limited to the aforementioned problems, and any other technical problems can be clearly understood from the following description by those skilled in the art to which the present disclosure pertains.

According to an embodiment of the present disclosure, a system for managing an electronic card of a vehicle may include a communication module that transmits and receives data, a memory storing terminal data obtained by matching an identification number of a vehicle with a first unique ID of a first terminal and a program instruction, a server that stores server data obtained by matching the identification number of the vehicle, the first unique ID of the first terminal, and a first electronic card, and a processor that executes the program instruction.

In an embodiment, the processor may recognize a unique ID of a terminal loaded into the vehicle, may compare the unique ID of the terminal loaded into the vehicle with the first unique ID stored in the memory to determine whether the terminal loaded into the vehicle is replaced, and may transmit a second unique ID of a second terminal to the server, when it is determined that the terminal loaded into the vehicle is replaced with the second terminal. The server may update the first unique ID to the second unique ID transmitted from the processor and may delete a second electronic card previously issued in response to the second terminal. The first terminal or the second terminal may include a terminal that wirelessly pays a toll in the vehicle using an electronic card.

In an embodiment, the server may back up data for at least one of the first unique ID of the first terminal or the first electronic card, or any combination thereof, to the server, when the terminal loaded into the vehicle is replaced with the second terminal.

In an embodiment, the server may delete the data backed up to the server, when a new electronic card is issued to the second terminal.

In an embodiment, the server may delete the data backed up to the server, when the first terminal is loaded into a vehicle different from the vehicle and a new electronic card is issued in response to the first terminal.

In an embodiment, the processor may determine whether the second terminal is replaced with the first terminal rather than a new terminal, using the data backed up to the server, when the second terminal is replaced with another terminal again.

In an embodiment, the processor may determine that the second terminal is replaced with the first terminal rather than the new terminal, when a unique ID of the other terminal replaced again is identical to the first unique ID of the first terminal, the first unique ID being backed up to the server.

In an embodiment, the server may fail to delete the first electronic card issued to the first terminal replaced again, when it is determined that the second terminal is replaced with the first terminal again.

In an embodiment, the server may update the second unique ID of the second terminal, the second unique ID being updated in the server, to the first unique ID of the first terminal again, when it is determined that the second terminal is replaced with the first terminal again.

In an embodiment, the electronic card may include a payment modality used to pay a toll of an electronic toll collection system (ETCS).

According to an embodiment of the present disclosure, an apparatus for managing an electronic card of a vehicle may include a communication module that transmits and receives data, a memory storing terminal data obtained by matching an identification number of a vehicle with a first unique ID of a first terminal and a program instruction, and a processor that executes the program instruction.

In an embodiment, the processor may recognize a unique ID of a terminal loaded into the vehicle, may compare the unique ID of the terminal loaded into the vehicle with the first unique ID stored in the memory to determine whether the terminal loaded into the vehicle is replaced, and may transmit a second unique ID of a second terminal to a server, when it is determined that the terminal loaded into the vehicle is replaced with the second terminal.

In an embodiment, the processor may back up data for at least one of the first unique ID of the first terminal or the first electronic card, or any combination thereof to the server, when the terminal loaded into the vehicle is replaced with the second terminal, and may determine whether the second terminal is replaced with the first terminal again rather than a new terminal, using the data backed up to the server, when the second terminal is replaced with another terminal again.

In an embodiment, the server may fail to delete a first electronic card issued to the first terminal replaced again, when it is determined that the second terminal is replaced with the first terminal again.

According to an embodiment of the present disclosure, a method for managing an electronic card of a vehicle may include recognizing, by a processor, a unique ID of a terminal loaded into a vehicle and comparing, by the processor, the unique ID of the terminal loaded into the vehicle with a first unique ID of a first terminal, the first unique ID being stored in a memory, to determine whether the terminal loaded into the vehicle is replaced, transmitting, by the processor, a second unique ID of a second terminal to a server, when it is determined that the terminal loaded into the vehicle is replaced with the second terminal, updating, by the server, the first unique ID to the second unique ID transmitted from the processor, and deleting, by the server, a second electronic device previously issued in response to the second terminal.

In an embodiment, a method may further include backing up, by the server, data for at least one of the first unique ID of the first terminal or a first electronic card, or any combination thereof to the server, when the terminal loaded into the vehicle is replaced with the second terminal.

In an embodiment, a method may further include deleting, by the server, data backed up to the server, when a new electronic card is issued to the first terminal or the second terminal.

In a method according to an embodiment, the recognizing of the unique ID of the terminal loaded into the vehicle by the processor and the comparing of the unique ID of the terminal loaded into the vehicle and the first unique ID of the first terminal to determine whether the terminal loaded into the vehicle is replaced by the processor may include determining, by the processor, whether the second terminal is replaced with the first terminal again rather than a new terminal, using data backed up to the server, when the second terminal is replaced with another terminal again.

In a method according to an embodiment, the determining of whether the second terminal is replaced with the first terminal again rather than the new terminal, using the data backed up to the server, by the processor, when the second terminal is replaced with the other terminal again, may include determining, by the processor, that the second terminal is replaced with the first terminal rather than the new terminal, when a unique ID of the other terminal replaced again is identical to the first unique ID of the first terminal, the first unique ID being backed up to the server.

In a method according to an embodiment, the deleting of the second electronic card previously issued in response to the second terminal by the server may include failing, by the server, to delete a first electronic card issued to the first terminal replaced again, when it is determined that the second terminal is replaced with the first terminal again.

In a method according to an embodiment, the updating of the first unique ID to the second unique ID transmitted from the processor by the server may include updating, by the server, the second unique ID of the second terminal, the second unique ID being updated in the server, to the first unique ID of the first terminal again, when it is determined that the second terminal is replaced with the first terminal again.

In a method according to an embodiment, the electronic card may include a payment modality used to pay a toll of an electronic toll collection system (ETCS).

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
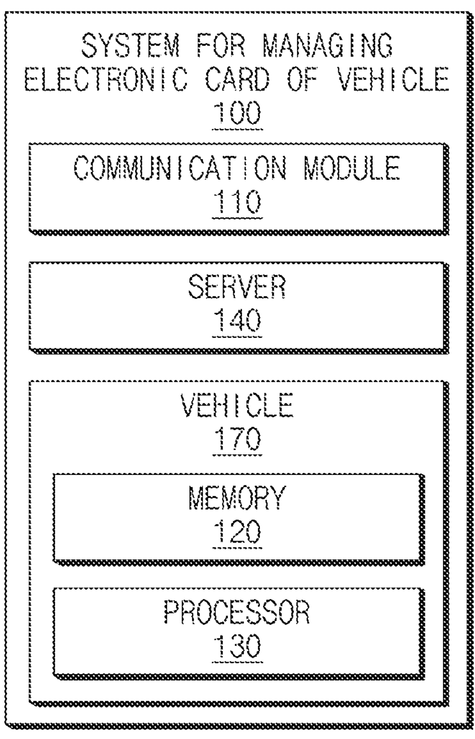
FIG. 1 is a block diagram illustrating a system for managing an electronic card of a vehicle according to an embodiment of the present disclosure.

Hereinafter, some embodiments of the present disclosure will be described in detail with reference to the example drawings. In adding reference numerals to the components of each drawing, it can be noted that identical components can be designated by identical numerals even when they are displayed on other drawings. In addition, a detailed description of well-known features or functions can be omitted to not unnecessarily obscure the gist of the present disclosure.

In describing components of example embodiments of the present disclosure, the terms "first," "second," "A," "B," "(a)," "(b)," and the like, may be used herein. Such terms can be used merely to distinguish one component from another component, and do not necessarily limit the corresponding components irrespective of the order or priority of the corresponding components. Furthermore, unless otherwise defined, terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art, for example.

Hereinafter, embodiments of the present disclosure will be described in detail with reference to FIGS. 1 to 5.

FIG. 1 is a block diagram illustrating a system for managing an electronic card of a vehicle according to an embodiment of the present disclosure.

According to an embodiment, a system 100 for managing an electronic card of a vehicle may include a communication module 110, a memory 120, a processor 130, and a server 140, any and all of which may be in plural. The components of the system 100 for managing the electronic card of the vehicle, which are shown in FIG. 1, are illustrative, and embodiments of the present disclosure are not necessarily limited thereto. For example, the system 100 for managing the electronic card of the vehicle may further include components that are not shown in FIG. 1.

According to an embodiment, the communication module 110 may include a modem for wireless Internet access. For example, the communication module 110 may access a wireless communication network of a wireless communication operator to facilitate wireless communication such as third generation mobile communications (3G), long term evolution (LTE), LTE-Advanced (LTE-A), or fifth generation mobile communications (5G). Furthermore, the communication module 110 may be loaded into a telematics unit and may include a radio frequency (RF) antenna and a communication control module.

According to an embodiment, the communication module 110 may perform communication for transmitting and receiving data associated with a unique ID of a terminal or an electronic card between a server 140 and a vehicle 170 through wireless communication.

According to an embodiment, the memory 120 may store a command and/or data. For example, the memory 120 may store computer-executable code with one instruction or two or more instructions, when executed by the processor 130, causing the system 100 for managing the electronic card of the vehicle to perform various operations. For example, the memory 120 may include a non-volatile memory (e.g., a read only memory (ROM)) and a volatile memory (e.g., a random access memory (RAM)).

According to an embodiment, the memory 120 may be implemented with the processor 130 as one chipset and may store various pieces of information associated with the system 100 for managing the electronic card of the vehicle. For example, the memory 120 may store information about an operation history of the processor 130.

According to an embodiment, the memory 120 may store terminal data obtained by matching an identification number of the vehicle with a first unique ID of a first terminal and computer-executable code including program instructions. For example, the identification number of the vehicle may include a unique serial number engraved on a vehicle chassis of the vehicle.

According to an embodiment, the first terminal and a second terminal that will be described below may refer to existing electronic card terminals loaded into the vehicle. For example, the electronic card terminal may function such that the vehicle is able to pay a service fee using the electronic card. As a detailed example, the electronic card terminal may store a card capable of automatically paying a highway toll, e.g., a Hipass card.

For example, the electronic card terminal may exchange information about dedicated short range communication (DSRC). The DSRC may be communication using an infrared scheme or a frequency scheme and may be used with/for an electronic toll collection system (ETCS). As a detailed example, the electronic card terminal may recognize information of the electronic card and may transmit the information of the electronic card to an antenna of a tollgate. When the antenna of the tollgate transmits information in which payment is processed to the electronic card terminal again, the electronic card terminal may record the information in which the payment is processed in the electronic card.

For example, the terminal associated with an embodiment of the present disclosure may include an embedded terminal. As a detailed example, the embedded terminal may refer to a terminal installed in the vehicle rather than a terminal in form of being mounted on the vehicle. Furthermore, as the embedded terminal is installed in the vehicle, it may be a terminal using an electronic card, rather than a physical card.

According to an embodiment, the processor 130 may recognize the unique ID of the terminal loaded into the vehicle and may compare the unique ID of the terminal loaded into the vehicle with the first unique ID stored in the memory 120 to determine whether the terminal loaded into the vehicle is replaced.

For example, when the terminal is loaded into the vehicle, the processor 130 may recognize and store the unique ID of the terminal loaded into the vehicle in the memory 120. The unique ID of the previously loaded terminal may be stored as the first unique ID in the memory 120.

For example, the first unique ID of the terminal, which is stored in the memory 120, may be used to be compared with the unique ID of the replaced terminal to determine whether the terminal loaded into the vehicle is replaced. As a detailed example, when the unique ID of the terminal, which is recognized by the processor 130, is not identical to the first unique ID stored in the memory 120, the processor 130 may determine that the terminal loaded into the vehicle is replaced.

According to an embodiment, when it is determined that the terminal loaded into the vehicle is replaced with a second terminal, the processor 130 may transmit a second unique ID of the second terminal to the server 140. Herein, the second unique ID of the second terminal is a unique identification number of the second terminal, which needs to be a unique ID different from the first unique ID.

For example, when it is determined that the terminal loaded into the vehicle is replaced with the second terminal, there may be a need to update the first unique ID of the first terminal, which is stored in the server 140, to the second unique ID of the second terminal currently loaded into the vehicle. Thus, the processor 130 may transmit the second unique ID of the second terminal to the server 140.

For example, when it is determined that the terminal loaded into the vehicle is replaced with the second terminal, the processor 130 may update and store the first unique ID stored in the memory 120 to the second unique ID of the second terminal. The second unique ID updated in the memory 120 may be used for the processor 130 to determine whether the second terminal is replaced. As a detailed example, when the unique ID of the terminal, which is recognized by the processor 130, is not identical to the second unique ID stored in the memory 120, the processor 130 may determine that the second terminal is replaced.

According to an embodiment, the server 140 may update the first unique ID to the second unique ID transmitted from the processor 130 and may delete a second electronic card previously issued in response to the second terminal.

For example, when receiving the second unique ID from the processor 130, the server 140 may update the first unique ID to the second unique ID.

For example, when there is the second electronic card previously issued to the second terminal, the server 140 may delete the second electronic card from the server 140 such that the second electronic card in another person's name is not used.

As another example, when there is the second electronic card previously issued to the second terminal, the server 140 may delete the second electronic card issued to the second terminal by use of the processor 130. The server 140 may delete the second electronic card issued to the second terminal, thus preventing the second electronic card in another person's name from being used.

According to an embodiment, when the terminal loaded into the vehicle is replaced with the second terminal, the server 140 may back up data for at least one of the first unique ID of the first terminal or the first electronic card of the first terminal, or any combination thereof.

For example, when the first terminal loaded into the vehicle is replaced, the server 140 may store and back up the first unique ID of the first terminal or the first electronic card, or both, to a backup database. When it is replaced with the first terminal again later, the backed-up data may be used to activate the first electronic card of the first terminal or match the first electronic card of the first terminal with the vehicle. A backup database may be included in the server 140, but not necessarily, for example.

According to an embodiment, when a new electronic card is issued to the second terminal, the server 140 may delete data backed up to the server 140.

For example, that the new electronic card is issued to the second terminal may indicate that the second terminal is used as the terminal of the vehicle. In other words, it may indicate that the first terminal is no longer used and is replaced with the second terminal. In this case, as it is not replaced with the first terminal again, because the data backed up to the server 140 is no longer needed, the server 140 may delete the data backed up to the server 140.

According to an embodiment, as the first terminal is loaded into another vehicle, when a new electronic card is issued in response to the first terminal, the server 140 may delete data backed up to the server 140.

For example, that the new electronic card is issued in response to the first terminal as the first terminal is loaded into the other vehicle may indicate that the first electronic card backed up to the server 140 is no longer used. Thus, because the data backed up to the server 140 is no longer needed, the server 140 may delete the data backed up to the server 140.

According to an embodiment, when the second terminal is replaced with another terminal, the processor 130 may determine whether the second terminal is replaced with the first terminal again rather than a new terminal, using the data backed up to the server 140.

For example, the first terminal may be replaced with another terminal again in the state in which it is replaced with the second terminal. In this case, the processor 130 may recognize a unique ID of the terminal replaced again and may identify whether the recognized unique ID of the terminal with the first unique ID of the first terminal, which is backed up to the server 140.

According to an embodiment, when the unique ID of the terminal replaced again is identical to the first unique ID, the processor 130 may determine that the second terminal is replaced with the first terminal again.

For example, when it is determined that the second terminal is replaced with the first terminal again, the server 140 may update the second unique ID stored in the server 140 to the first unique ID again. When updating the second unique ID to the first unique ID, the first unique ID of the first terminal, which is backed up to the server 140, may be used.

For example, when it is determined that the second terminal is replaced with the first terminal again, as it is restored to the existing first terminal, the server 140 may fail to delete the first electronic card issued to the first terminal. In this case, a user may use the first electronic card issued to the first terminal without issuing a new electronic card.

According to an embodiment, when the unique ID of the terminal replaced again is not identical to the first unique ID, the processor 130 may determine that the second terminal is replaced with another new terminal. Herein, the new terminal may be a third terminal different from the first terminal and the second terminal.

For example, when it is determined that the second terminal is replaced with the new terminal, the server 140 may update the second unique ID stored in the server 140 to a unique ID of the new terminal. As a detailed example, the unique ID of the new terminal may be a third unique ID different from the first unique ID and the second unique ID.

For example, when it is determined that the second terminal is replaced with the new terminal, the server 140 may delete an electronic card issued to the new terminal, such that the electronic card of the new terminal in another person's name is not used.

According to an embodiment, the system 100 for managing the electronic card of the vehicle may include a system for managing an electronic card of a vehicle for using the electronic toll collection system (ETCS).

For example, the electronic card may include a payment modality used to pay a toll of the ETCS. As a detailed example, the electronic card may include a card for paying a toll on a toll road.

For example, each of the first terminal and the second terminal may include a terminal that stores an electronic card used to pay a toll of the ETCS. As a detailed example, each of the first terminal and the second terminal may include a terminal capable of storing a card (e.g., Hipass) or an e-card (e.g., E-Hipass) for paying a toll on a toll road.

The example Hipass refers to the ETCS in Korea and corresponds to a detailed example for convenience of description for an embodiment of the present disclosure. The name of the ETCS applied to each country may vary for each country. Thus, an embodiment of the present disclosure is not limited to the system with the name Hipass, which may be applied to all of systems for paying a toll on a toll road.

Figure 2:
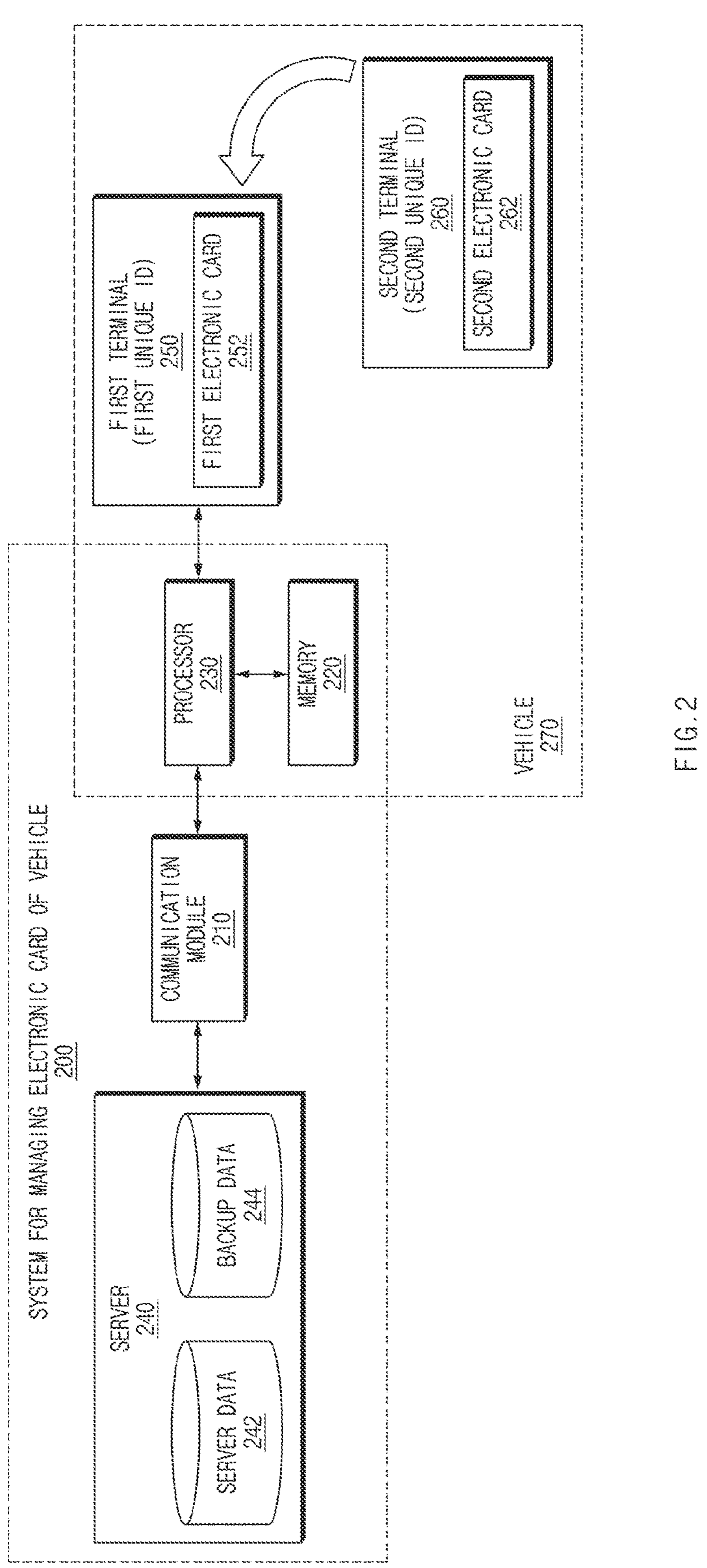
FIG. 2 is a diagram illustrating a system for managing an electronic card of a vehicle according to an embodiment of the present disclosure.

FIG. 2 is a diagram illustrating a system for managing an electronic card of a vehicle according to an embodiment of the present disclosure.

According to an embodiment, a system 200 for managing an electronic card of a vehicle in a server may include a server 240, a communication module 210, a memory 220, and a processor 230, any and all of which may be in plural, for example. The components of the system 200 for managing the electronic card of the vehicle in the server shown in FIG. 2 are illustrative, and embodiments of the present disclosure are not necessarily limited thereto. For example, the system 200 for managing the electronic card of the vehicle in the server may further include components which are not shown in FIG. 2.

According to an embodiment, a vehicle 270 may include the memory 220, the processor 230, and an electronic card terminal. Herein, the electronic card terminal may include a second terminal 260 that replaced a first terminal 250. The vehicle 270 shown in FIG. 2 is illustrative and embodiments of the present disclosure are not necessarily limited thereto. For example, the vehicle 270 may further include components which are not shown in FIG. 2.

According to an embodiment, the processor 230 may recognize a first unique ID of the first terminal 250 loaded into the vehicle 270. The processor 230 may store the first unique ID in a memory 220 and may transmit the first unique ID to the server 240 through wireless communication which uses the communication module 210. For example, the vehicle 270 and the first unique ID of the first terminal 250 may be matched and stored in the memory 220.

According to an embodiment, the server 240 may receive and store the first unique ID from the processor 230 as server data 242. For example, the server 240 may include a database that stores a unique ID of a terminal.

According to an embodiment, the processor 230 may determine whether the terminal loaded into the vehicle 270 is replaced. For example, when the recognized unique ID of the terminal is not identical to the first unique ID stored in the memory 220, the processor 230 may determine that the first terminal 250 is replaced with the second terminal 260.

According to an embodiment, when it is determined that the first terminal 250 is replaced with the second terminal 260, the processor 230 may update and store the first unique ID stored in the memory 220 to a second unique ID of the second terminal 260. Furthermore, the processor 230 may transmit the second unique ID of the second terminal 260 to the server 240 through the communication module 210. In some embodiments, the communication module 210 may be included in the vehicle 270.

According to an embodiment, the server 240 may receive the second unique ID of the second terminal 260 and may update the server data 242. For example, the first unique ID of the server data 242 may be updated and stored to the second unique ID in the database.

According to an embodiment, when a second electronic card 262 is issued to the second terminal 260, the server 240 may delete the second electronic card 262 that is previously issued in response to the second terminal 260. As another example, the server 240 may delete the second electronic card 262 issued to the second terminal 260 by use of the processor 230. Because information about the second electronic card 262 issued to the second terminal 260 is deleted from the server 240 or the second terminal 260, the server 240 may prevent the second electronic card 262 in another person's name from being used.

According to an embodiment, when it is determined that the first terminal 250 is replaced with the second terminal 260, the server 240 may back up data for at least one of the first unique ID of the first terminal 250 or the first electronic card 252, or any combination thereof to the server 240 (as backup data 244).

For example, when the first terminal 250 is replaced, the server 240 may store the first unique ID of the first terminal 250 or the first electronic card 252, or both, as backup data 244. When the second terminal 260 is replaced with the first terminal 250 again later, the backup data 244 may be used to activate the first electronic card 252 of the first terminal 250 or match the first electronic card 252 of the first terminal 250 with the vehicle 270. The backup data 244 may be stored in a backup database of the server 240.

According to an embodiment, when a new electronic card is issued to the second terminal 260, the server 240 may delete the data 244 backed up to the server 240.

For example, that the new electronic card is issued to the second terminal 260 may indicate that the first terminal 250 is no longer used and that the terminal of the vehicle 270 is replaced with the second terminal 260. In this case, because the data 244 backed up to the server 240 is no longer needed, the server 240 may delete the data 244 backed up to the server 240.

According to an embodiment, as the first terminal 250 is loaded into another vehicle, when a new electronic card is issued in response to the first terminal 250, the server 240 may delete the data 244 backed up to the server 240.

For example, that the new electronic card is issued in response to the first terminal 250 as the first terminal 250 is loaded into the other vehicle may indicate that information about the first electronic card 252 backed up to the server 240 is no longer used. Thus, because the data 244 backed up to the server 240 is no longer needed, the server 240 may delete the data 244 backed up to the server 240.

According to an embodiment, when the second terminal 260 is replaced with another terminal again, the processor 230 may determine whether the second terminal 260 is replaced with the first terminal 250 again rather than a new terminal, using the data 244 backed up to the server 240.

For example, the first terminal 250 may be replaced with another terminal again in the state in which it is replaced with the second terminal 260. In this case, the processor 230 may recognize a unique ID of the terminal replaced again and may identify whether the recognized unique ID of the terminal with the first unique ID of the first terminal 250, which is backed up to the server 240.

According to an embodiment, when the unique ID of the terminal replaced again is identical to the first unique ID, the processor 230 may determine that the second terminal 260 is replaced with the first terminal 250 again.

For example, when it is determined that the second terminal 260 is replaced with the first terminal 250 again, the server 240 may update a second unique ID stored in the server 240 to the first unique ID again. When updating the second unique ID to the first unique ID, the first unique ID of the first terminal 250, which is backed up to the server 240, may be used.

For example, when it is determined that the second terminal 260 is replaced with the first terminal 250 again, as the second terminal 260 is restored to the existing first terminal 250, the server 240 may fail to delete the first electronic card 252 issued to the first terminal 250. In this case, a user may use the first electronic card 252 issued to the first terminal 250 without issuing a new electronic card.

According to an embodiment, when the unique ID of the terminal replaced again is not identical to the first unique ID, the processor 230 may determine that the second terminal 260 is replaced with another new terminal. Herein, the new terminal may be a third terminal different from the first terminal 250 and the second terminal 260.

Hereinafter, a description will be given in detail of a method for managing an electronic card of a vehicle according to an embodiment of the present disclosure with reference to FIGS. 3 and 4.

Figure 3:
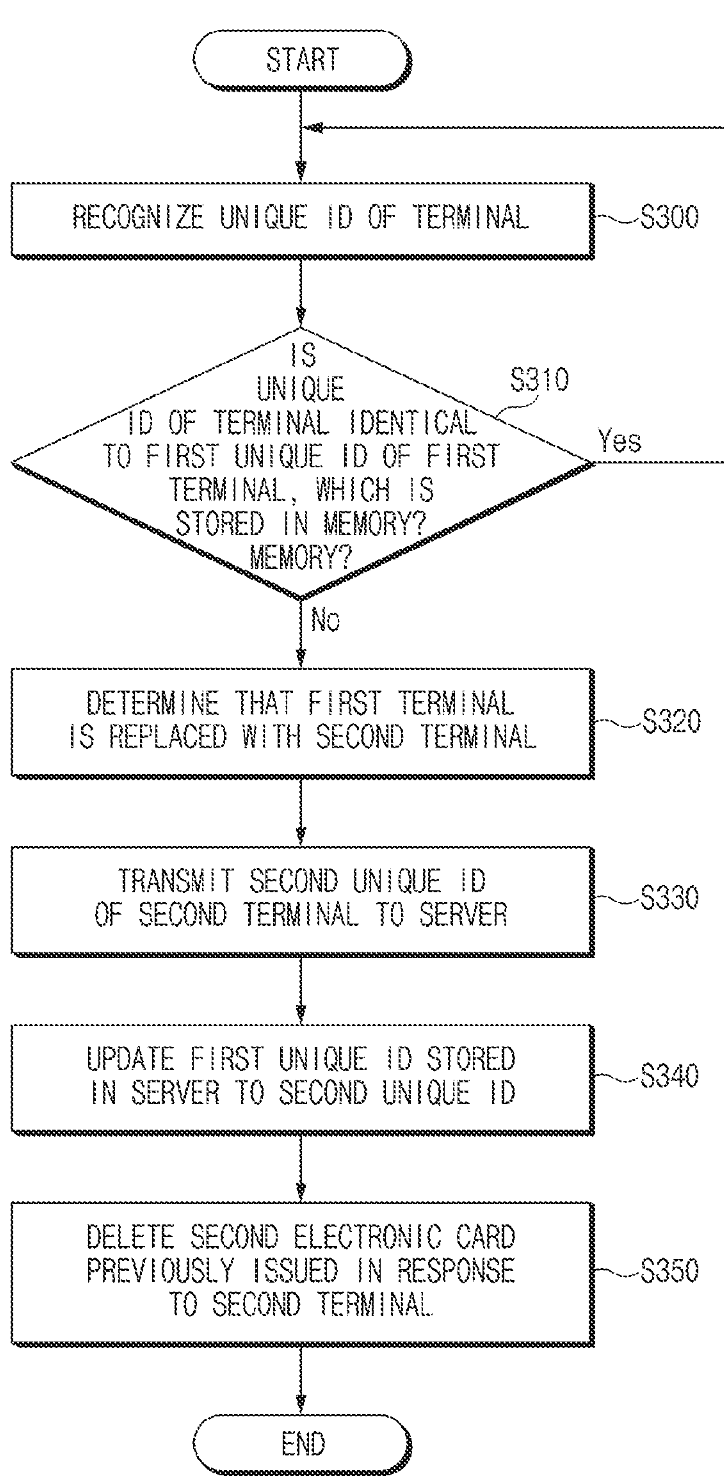
FIG. 3 is a flowchart for describing a method for managing an electronic card of a vehicle according to an embodiment of the present disclosure.

FIG. 3 is a flowchart for describing a method for managing an electronic card of a vehicle according to an embodiment of the present disclosure.

Referring to FIG. 3, a method for managing an electronic card of a vehicle according to an embodiment may include recognizing, by a processor, a unique ID of a terminal loaded into a vehicle and comparing, by the processor, the unique ID of the terminal loaded into the vehicle with a first unique ID of a first terminal, which is stored in a memory, to determine whether the terminal loaded into the vehicle is replaced, transmitting, by the processor, a second unique ID of a second terminal to a server, when it is determined that the terminal loaded into the vehicle is replaced with the second terminal, updating, by the server, the first unique ID to the second unique ID transmitted from the processor, and deleting, by the server, a second electronic card previously issued to the second terminal.

According to an embodiment, in operation S300, the processor may recognize the unique ID of the terminal loaded into the vehicle. For example, the processor may store the first unique ID in the memory and may transmit the first unique ID to the server through wireless communication that uses a communication module.

According to an embodiment, the processor may determine whether the terminal loaded into the vehicle is replaced. For example, in operation S310, the processor may identify whether the recognized unique ID of the terminal is identical to the first unique ID of the first terminal, which is stored in the memory, to determine whether the terminal is replaced. For example, when the recognized unique ID of the terminal is identical to the first unique ID of the first terminal, which is stored in the memory, the processor may determine that the terminal loaded into the vehicle is not replaced.

According to an embodiment, when the recognized unique ID of the terminal is different from the first unique ID of the first terminal, which is stored in the memory, the processor may determine that the first terminal is replaced with a second terminal (operation S32).

According to an embodiment, when it is determined that the first terminal is replaced with the second terminal, then at operation S330, the processor may transmit the second unique ID of the second terminal to the server. As another example, the processor may update and store the first unique ID stored in the memory to the second unique ID of the second terminal.

According to an embodiment, in operation S340, the server may receive the second unique ID of the second terminal and may update server data. For example, the first unique ID of the server data may be updated/replaced and stored as the second unique ID in the database.

According to an embodiment, when a second electronic card was issued to the second terminal, at operation S350, the server may delete the second electronic card previously issued to the second terminal. As another example, the server may delete the second electronic card issued to the second terminal by use of the processor.

According to an embodiment according to FIG. 3, when the first terminal is replaced with the second terminal, because information about the second electronic card issued to the second terminal is deleted from the server or the second terminal, the system for managing the electronic card of the vehicle may prevent the second electronic card in another person's name from being used.

Figure 4:
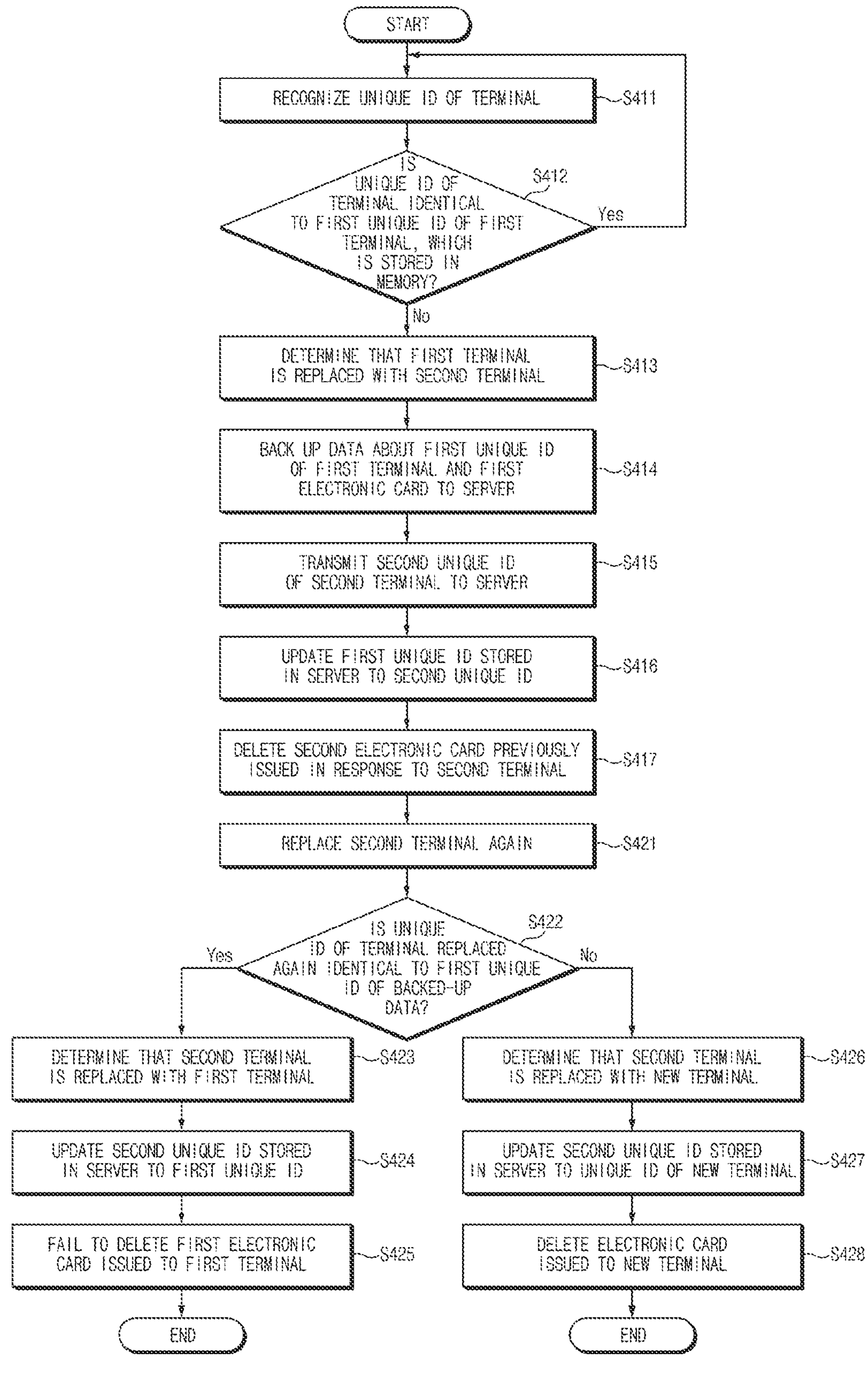
FIG. 4 is a flowchart for describing a method for managing an electronic card of a vehicle when it is replaced with a first terminal again according to an embodiment of the present disclosure.

FIG. 4 is a flowchart for describing a method for managing an electronic card of a vehicle when it is replaced with a first terminal again according to an embodiment of the present disclosure.

Referring to FIG. 4, like FIG. 3, the method for managing the electronic card of the vehicle when it is replaced with the first terminal again may include recognizing (operation S411), by a processor, a unique ID of a terminal loaded into a vehicle, identifying (operation S412), by the processor, whether the recognized unique ID of the terminal is identical to a first unique ID of a first terminal, which is stored in a memory, to determine whether the terminal is replaced, determining (operation S413), by the processor, whether the first terminal is replaced with a second terminal, when the recognized unique ID of the terminal is different from the first unique ID of the first terminal, which is stored in the memory, transmitting (operation S415), by the processor, a second unique ID of the second terminal to a server through a communication module, when it is determined that the first terminal is replaced with the second terminal, receiving (operation S416), by the server, the second unique ID of the second terminal and updating, by the server, server data, and deleting (operation S417), by the server, a second electronic card previously issued to the second terminal, when the second electronic card was issued to the second terminal.

According to an embodiment, the method for managing the electronic card of the vehicle may further include backing up (operation S414), by the server, data about the first unique ID of the first terminal and a first electronic card to the server, when it is determined that the first terminal is replaced with the second terminal.

According to an embodiment, at operation S421, the second terminal may be replaced with another terminal again.

According to an embodiment, when the second terminal is replaced with another terminal, the processor may determine whether the second terminal is replaced with the first terminal again rather than a new terminal, using the data backed up to the server. For example, in operation S422, the processor may determine whether a unique ID of the terminal replaced again is identical to the first unique ID of the backed-up data.

According to an embodiment, when the unique ID of the terminal replaced again is identical to the first unique ID of the backed-up data, in operation S423, the processor may determine that the second terminal is replaced with the first terminal again.

According to an embodiment, when it is determined that the second terminal is replaced with the first terminal again, at operation S424, the processor may update the second unique ID stored in the server to the first unique ID. When the second unique ID is updated to the first unique ID, the first unique ID of the first terminal, which is backed up to the server, may be used.

According to an embodiment, when it is determined that the second terminal is replaced with the first terminal, in operation S425, the processor may fail to delete the first electronic card issued to the first terminal. In this case, a user may use the first electronic card issued to the first terminal without issuing a new electronic card.

According to an embodiment, when the unique ID of the terminal replaced again is not identical to the first unique ID of the backed-up data, at operation S426, the processor may determine that the second terminal is replaced with a new (third) terminal.

According to an embodiment, when it is determined that the second terminal is replaced with the new (third) terminal, at operation S427, the server may update the second unique ID stored in the server to a unique ID of the new (third) terminal. For example, the unique ID of the new terminal may be a third unique ID different from the first unique ID and the second unique ID.

According to an embodiment, when it is determined that the second terminal is replaced with the new terminal, at operation S428 the server may delete an electronic card previously issued to the new terminal, such that the electronic card of the new terminal in another person's name is not used.

According to an embodiment according to FIG. 4, a system for managing the electronic card of the vehicle may determine whether the second terminal is replaced with the first terminal again based on the backed-up data of the first terminal, when the first terminal loaded into the vehicle is replaced, and may fail to delete the electronic card issued to the first terminal, when the second terminal is replaced with the first terminal again, thus having the convenience of not having to newly generate an electronic card in the first terminal.

Figure 5:
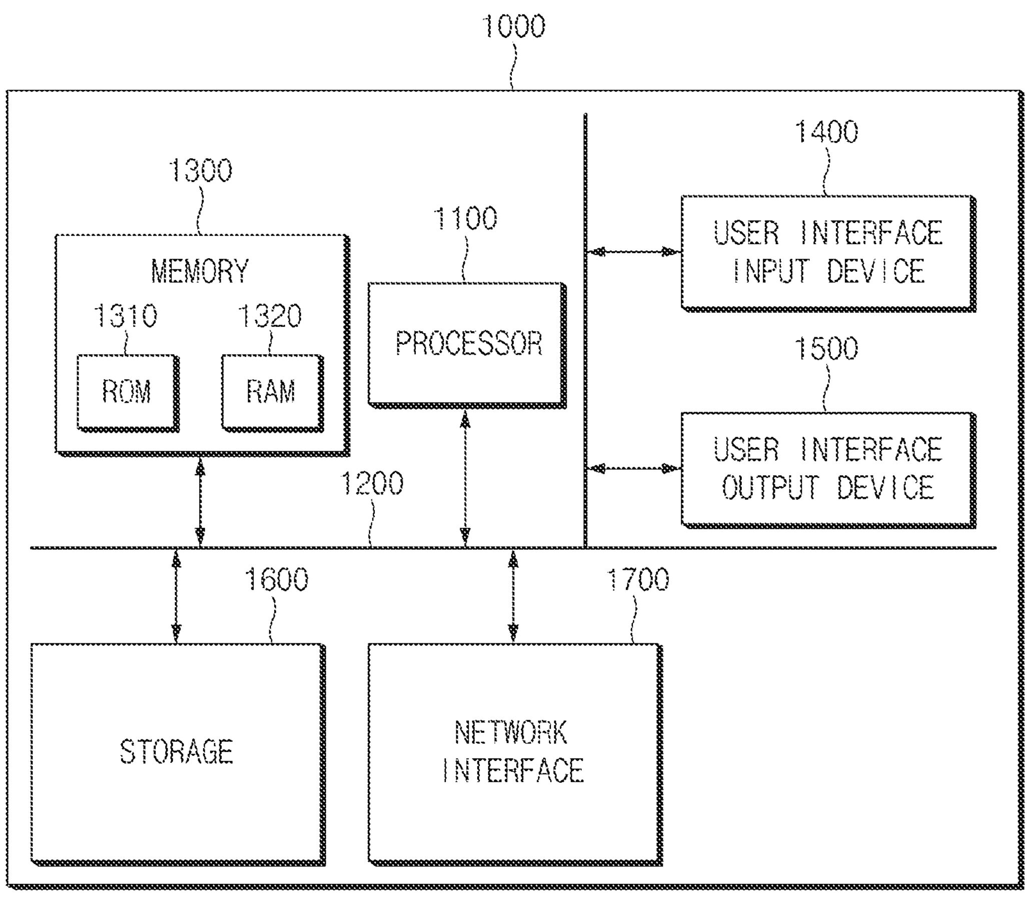
FIG. 5 is a block diagram illustrating a computing system according to an embodiment of the present disclosure.

FIG. 5 is a block diagram illustrating a computing system according to an embodiment of the present disclosure.

Referring to FIG. 5, a computing system 1000 may include at least one processor 1100, a memory 1300, a user interface input device 1400, a user interface output device 1500, storage 1600, and a network interface 1700, which can be connected with each other via a bus 1200, and any and all of which may be in plural.

The processor 1100 may be a central processing unit (CPU) or a semiconductor device that processes computer-executable code including instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of a hardware module and a software module, which is executed by the processor(s) 1100. The software module may reside on a storage medium (that is, the memory 1300 and/or the storage 1600) such as a RAM, a flash memory, a ROM, an EPROM, an EEPROM, a register, a hard disc, a removable disk, a CD-ROM, or any combination thereof, for example.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

In an embodiment, a system may delete an electronic card of a replaced terminal, which was previously issued to the replaced terminal, when it is determined that the terminal loaded into the vehicle is replaced, thus preventing the electronic card in another person's name from being randomly used.

In an embodiment, a system may back up data associated with an electronic card of an existing terminal, because or in response to the terminal loaded into the vehicle being replaced, thus activating the electronic card of the existing terminal and an electronic card of the server, when the replaced terminal is replaced with the existing terminal again.

In an embodiment, a system may delete backed-up data of the existing terminal, because or in response to a new electronic card being issued to the replaced terminal or the existing terminal, thus preventing the backed-up data of the existing terminal from being leaked.

In an embodiment, a system may fail to delete the electronic card issued to the existing terminal, when it is replaced with the existing terminal, thus having the convenience of not having to newly generate an electronic card in the existing terminal.

Hereinabove, although the present disclosure has been described with reference to example embodiments and the accompanying drawings, the present disclosure is not necessarily limited thereto, and may be variously modified and altered by those skilled in the art to which the present disclosure pertains without departing from the spirit and scope of the present disclosure claimed in the following claims.

Therefore, embodiments of the present disclosure are not intended to necessarily limit the technical spirit of the present disclosure, and are provided for the illustrative purposes. The scope of the present disclosure can be construed based on the accompanying claims, and technical ideas within a scope or scopes equivalent to the claims can be included in the scope of the present disclosure.

What is claimed is:

1. A system for managing an electronic card of a vehicle, the system comprising:
- memory configured to store computer-executable code and terminal data obtained by matching an identification number of the vehicle with a first unique identification of a first terminal;
- a server configured to store server data obtained by matching the identification number of the vehicle, the first unique identification of the first terminal, and a first electronic card; and
- a processor configured to execute the code, wherein the code comprises first program instructions for the processor to:
  - recognize a unique identification of a terminal loaded in the vehicle, wherein the terminal is configured to wirelessly pay a toll using the electronic card being configured in the terminal,
  - compare the unique identification of the terminal loaded into the vehicle with the first unique identification stored in the memory to determine whether the terminal loaded into the vehicle is replaced, and in response to determining that the terminal loaded into the vehicle is replaced with a second terminal, transmit a second unique identification of the second terminal to the server, and wherein the server is configured to update the first unique identification to the second unique identification transmitted from the processor and delete a second electronic card previously issued in response to detection of the second terminal.

2. The system of claim 1, wherein the server is configured to back up data for one of or both of the first unique identification of the first terminal and the first electronic card to a backup database of the server, in response to the terminal loaded into the vehicle being replaced with the second terminal.

3. The system of claim 2, wherein the server is configured to delete the data backed up to the backup database of the server, in response to a new electronic card being issued to the second terminal.

4. The system of claim 2, wherein the server is configured to delete the data backed up to the backup database of the server, in response to the first terminal being loaded into another vehicle different from the vehicle and a new electronic card being issued to the first terminal.

5. The system of claim 2, wherein the code further comprises second program instructions for the processor to determine whether the second terminal is replaced with the first terminal rather than a third terminal, using the data backed up to a backup database of the server, in response to the second terminal being replaced with another terminal again.

6. The system of claim 2, wherein the code further comprises second program instructions for the processor to determine that the second terminal is replaced with the first terminal rather than a third terminal, in response to another unique identification of another terminal replacing the second terminal being identical to the first unique identification of the first terminal, wherein the first unique identification is backed up in the backup database of the server.

7. The system of claim 6, wherein the server is configured to not delete the first electronic card issued to the first terminal replacing the second terminal, in response to it being determined that the second terminal is replaced with the first terminal.

8. The system of claim 6, wherein the server is configured to update the second unique identification of the second terminal to the first unique identification of the first terminal, in response to it being determined that the second terminal is replaced with the first terminal.

9. The system of claim 1, wherein the electronic card includes a payment modality configured to pay tolls of an electronic toll collection system (ETCS).

10. An apparatus for managing an electronic card of a vehicle, the apparatus comprising:

a memory storing computer-executable code and terminal data obtained by matching an identification number of the vehicle with a first unique identification of a first terminal; and a processor configured to execute the computer-executable code, wherein the code comprises first program instructions for the processor to recognize a unique identification of a terminal loaded in the vehicle, compare the unique identification of the terminal loaded in the vehicle with the first unique identification stored in the memory to determine whether the terminal loaded in the vehicle is replaced, and in response to determining that the terminal loaded in the vehicle is replaced with a second terminal, transmit a second unique identification of the second terminal to a server and delete a second electronic card previously issued in response to detection of the second terminal.

11. The apparatus of claim 10, wherein the code further comprises second program instructions for the processor to prompt a first operation to back up first data including one of or both of the first unique identification of the first terminal and a first electronic card in a backup database of the server, in response to determining that the terminal loaded in the vehicle is replaced with the second terminal, and determine whether the second terminal is replaced with the first terminal rather than a third terminal, by comparing a third unique identification of the third terminal with the first unique identification of the first terminal using the first data backed up in the backup database of the server.

12. The apparatus of claim 10, wherein the server is configured to not delete a first electronic card previously issued to the first terminal, in response to the processor determining that the second terminal is replaced with the first terminal.

13. A method for managing an electronic card of a vehicle, the method comprising:

recognizing a unique identification of a terminal loaded in the vehicle;

comparing the unique identification of the terminal loaded in the vehicle with a first unique identification of a first terminal, wherein the first unique identification is stored in a memory of the vehicle, to determine whether the terminal loaded into the vehicle is replaced;

determining that the terminal in the vehicle is replaced with a second terminal;

transmitting a second unique identification of the second terminal to a server based on determining that the terminal in the vehicle is replaced with the second terminal;

updating the first unique identification to the second unique identification in a server database of the server; and deleting a second electronic card previously issued in response to detection of the second terminal.

14. The method of claim 13, further comprising, in response to the terminal loaded into the vehicle being replaced with the second terminal, storing first data including one of or both of the first unique identification of the first terminal and a first electronic card to a backup database of the server.

15. The method of claim 14, further comprising, in response to a new electronic card being issued to the second terminal or the first terminal, deleting the first data stored in the backup database of the server.

16. The method of claim 14, wherein the recognizing of the unique identification of the terminal loaded in the vehicle and the comparing of the unique identification of the terminal loaded in the vehicle with the first unique identification of the first terminal are together replaced by determining whether the second terminal is replaced with the first terminal rather than a third terminal using the first data in response to the second terminal being replaced.

17. The method of claim 16, wherein the determining of whether the second terminal is replaced with the first terminal rather than the third terminal includes determining that the second terminal is replaced with the first terminal based on a replaced unique identification being identical to the first unique identification of the first terminal.

18. The method of claim 16, further comprising not deleting the first electronic card issued to the first terminal in response to the determining that the second terminal is replaced with the first terminal.

19. The method of claim 16, wherein the updating of the first unique identification to the second unique identification is replaced by updating the second unique identification of the second terminal to the first unique identification of the first terminal in response to determining that the second terminal is replaced with the first terminal.

20. The method of claim 13, wherein the electronic card includes a payment modality configured to pay tolls of an electronic toll collection system (ETCS).

* * * * *